US012683219B2

(12) United States Patent
Yoon

(10) Patent No.: US 12,683,219 B2
(45) Date of Patent: *Jul. 14, 2026

(54) BATTERY MODULE COMPRISING BENT VAPOR CHAMBER

(71) Applicant: HYUNDAI MOBIS CO., LTD., Seoul (KR)

(72) Inventor: Young Chan Yoon, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 555 days.

This patent is subject to a terminal disclaimer.

(21) Appl. No.: 18/203,281

(22) Filed: May 30, 2023

(65) Prior Publication Data

US 2024/0170765 A1       May 23, 2024

(30) Foreign Application Priority Data

Nov. 21, 2022    (KR) ........................ 10-2022-0156160

(51) Int. Cl.
| | |
|---|---|
| *H01M 10/6569* | (2014.01) |
| *H01M 10/48* | (2006.01) |
| *H01M 10/613* | (2014.01) |
| *H01M 10/653* | (2014.01) |
| *H01M 50/209* | (2021.01) |
| *H01M 50/284* | (2021.01) |

(52) U.S. Cl.
CPC ..... *H01M 10/6569* (2015.04); *H01M 10/482* (2013.01); *H01M 10/486* (2013.01); *H01M 10/613* (2015.04); *H01M 10/653* (2015.04); *H01M 50/209* (2021.01); *H01M 50/284* (2021.01)

(58) Field of Classification Search
CPC ........... H01M 10/6569; H01M 10/482; H01M 10/486; H01M 10/613; H01M 10/653; H01M 50/209; H01M 50/284; H01M 10/625; H01M 10/647; H01M 10/6551; H01M 10/6556; H01M 10/617; H01M 10/6554; H01M 10/659; H01M 10/4257; H01M 10/651; H01M 50/211
See application file for complete search history.

(56) References Cited

U.S. PATENT DOCUMENTS

| | | | | |
|---|---|---|---|---|
| 2018/0145382 A1* | 5/2018 | Harris | .................. | H01M 10/643 |
| 2018/0183118 A1* | 6/2018 | Harris | ............... | H01M 10/6551 |
| 2021/0074969 A1* | 3/2021 | Bourke | ............. | H01M 10/6557 |
| 2022/0021049 A1* | 1/2022 | Shieh | ................ | H01M 10/6554 |
| 2023/0238632 A1* | 7/2023 | Kritzer | ............... | H01M 10/613 |
| | | | | 429/62 |
| 2024/0170766 A1* | 5/2024 | Yoon | ................... | H01M 10/653 |

FOREIGN PATENT DOCUMENTS

| | | |
|---|---|---|
| CN | 108183282 A | 6/2018 |
| CN | 115172944 A | 10/2022 |
| DE | 197 24 020 A1 | 1/1998 |
| FR | 2 988 824 A3 | 10/2013 |

OTHER PUBLICATIONS

Office Action issued on Feb. 26, 2025 in German Patent Application No. DE 10 2023 129 418.0.

* cited by examiner

*Primary Examiner* — Stewart A Fraser

(74) *Attorney, Agent, or Firm* — Morgan, Lewis & Bockius LLP

(57) ABSTRACT

Provided is a battery module comprising a bent vapor chamber. In this battery module, a plurality of battery cells included in the battery module are cooled by the plurality of bent vapor chambers.

20 Claims, 8 Drawing Sheets

[FIG. 1]
*Prior Art*
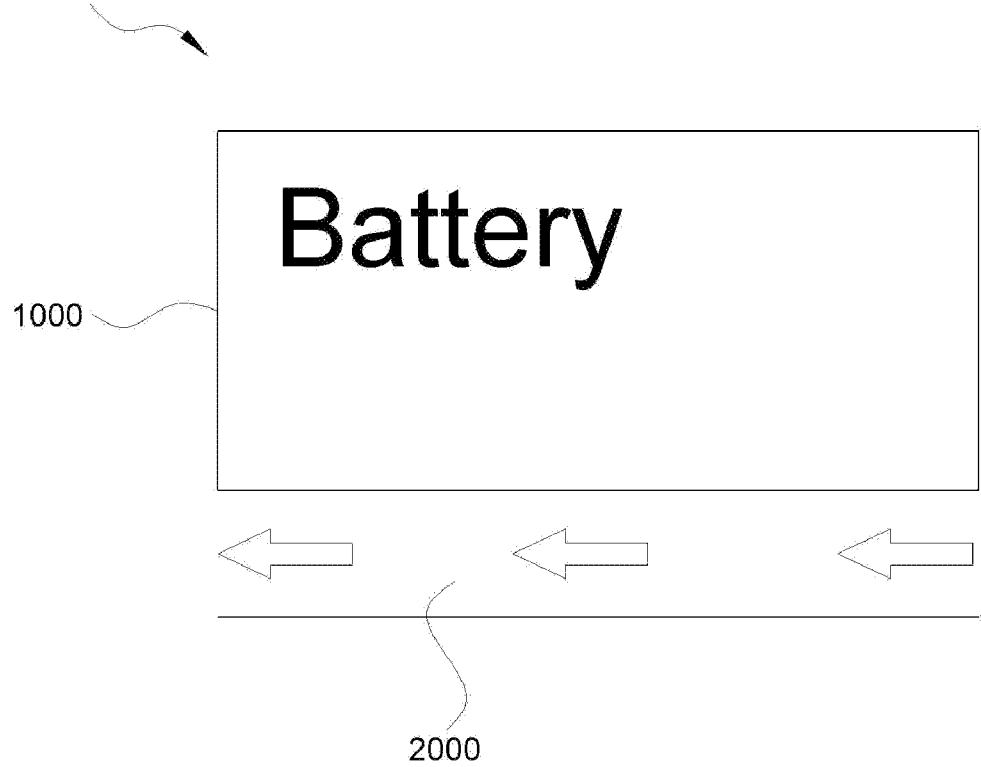

[FIG. 2]
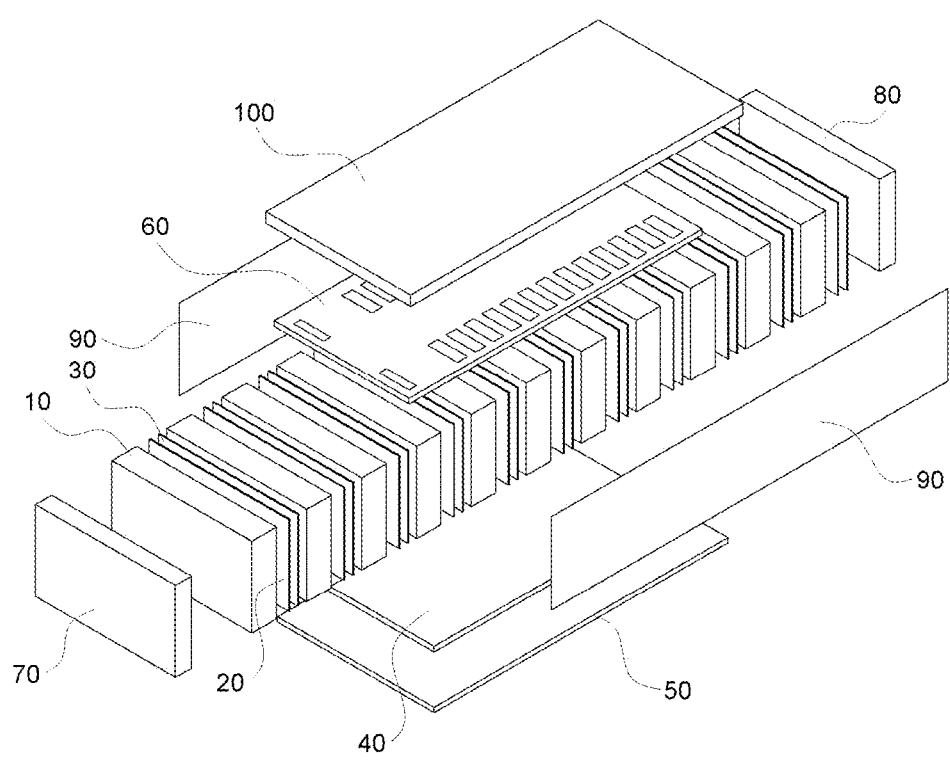

[FIG. 3]
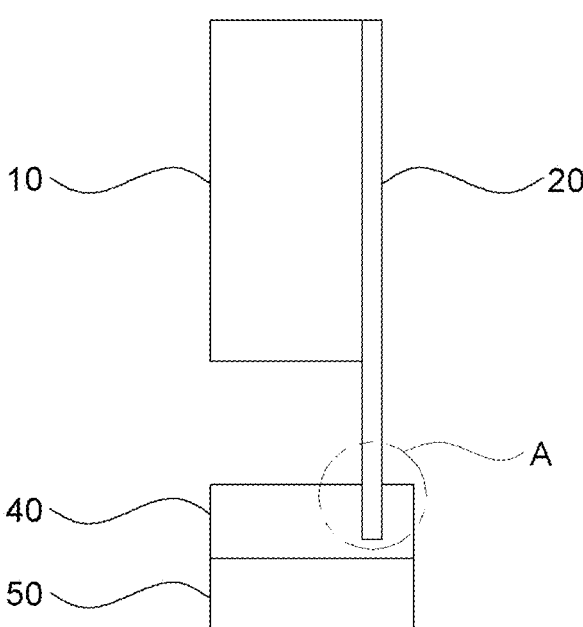

[FIG. 4]
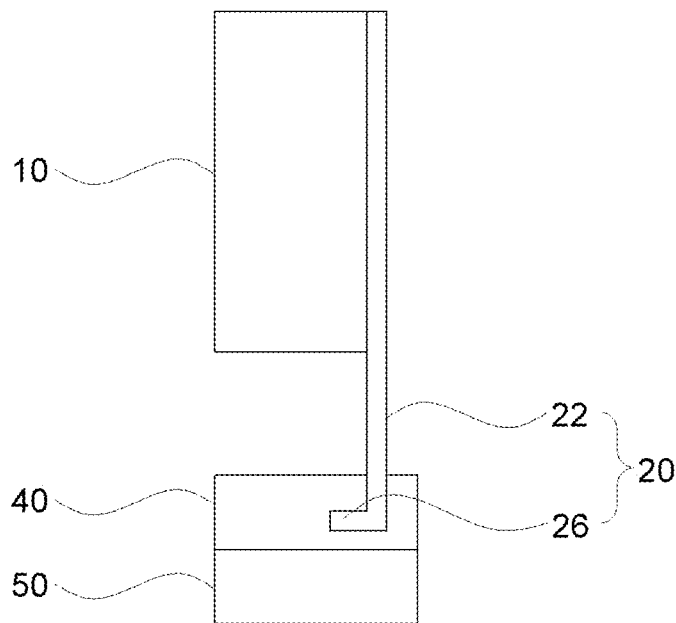

[FIG. 5]
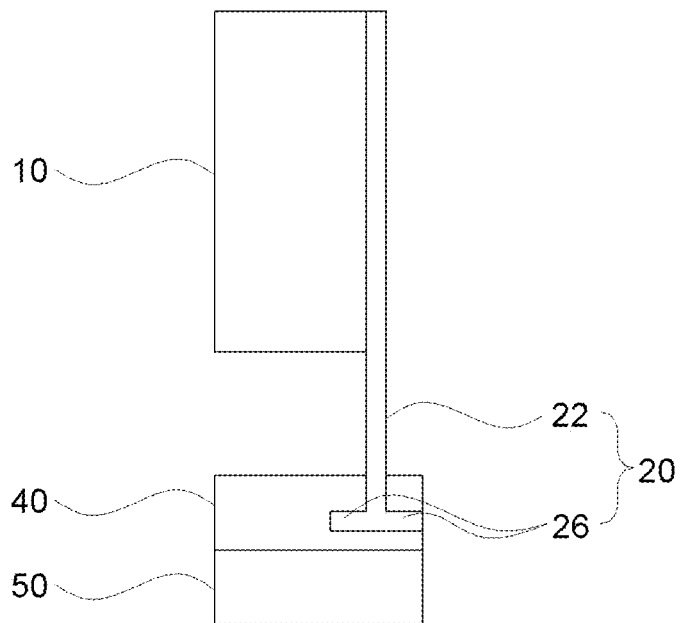

[FIG. 6]
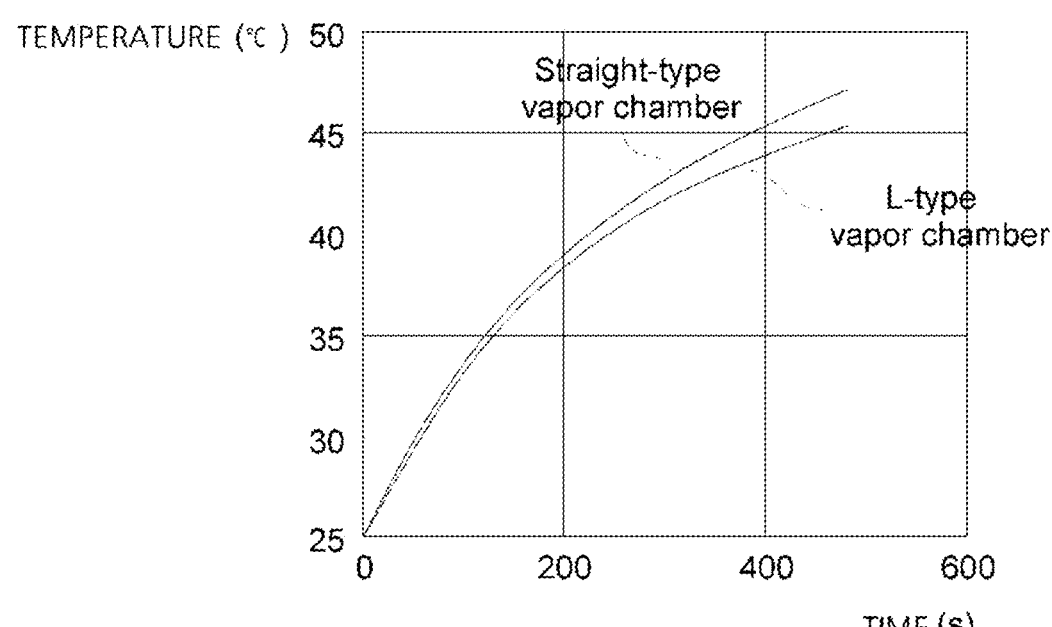

[FIG. 7]
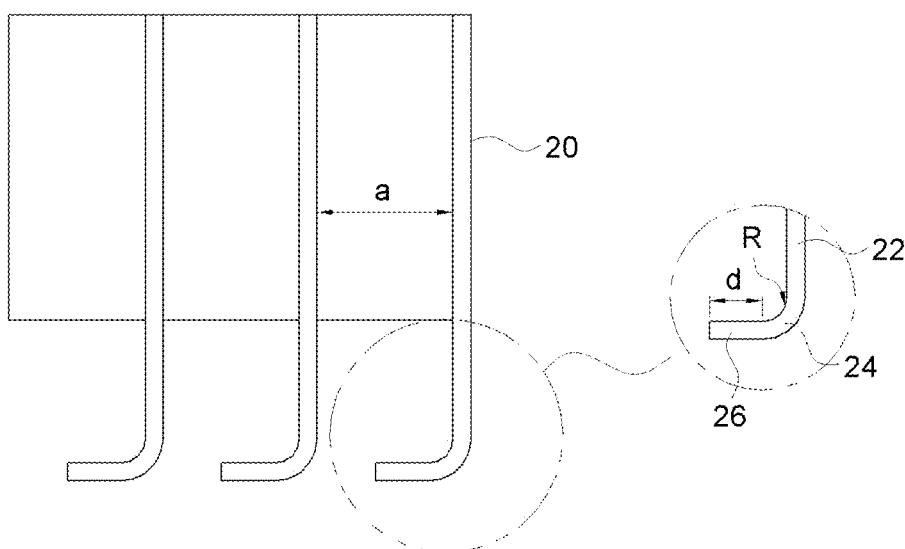

[FIG. 8]
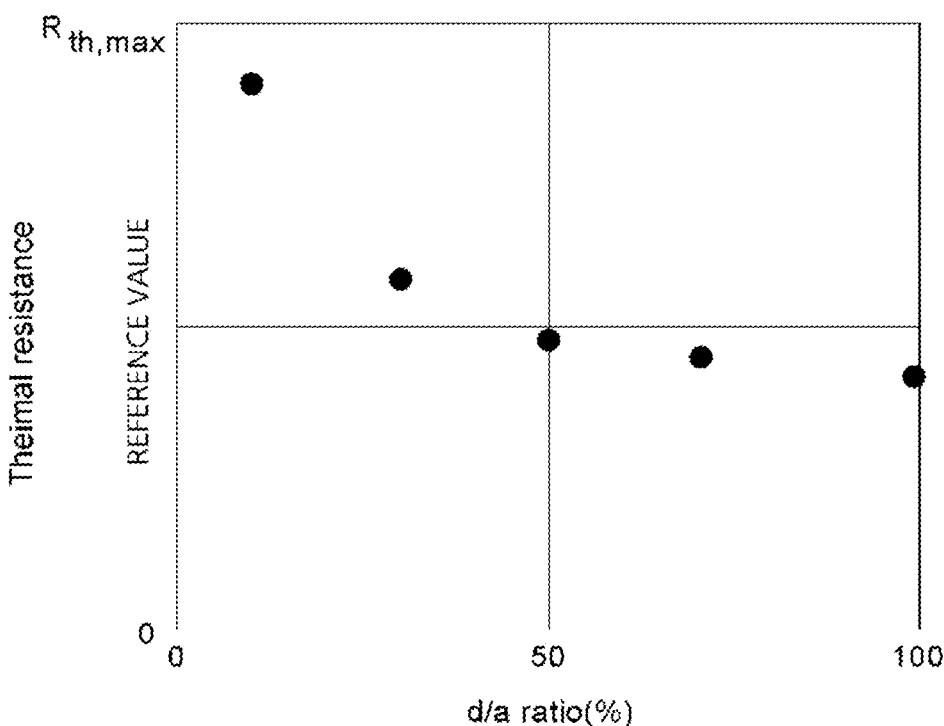

BATTERY MODULE COMPRISING BENT VAPOR CHAMBER

CROSS-REFERENCE TO RELATED APPLICATIONS

This application claims priority under 35 U.S.C. § 119 to Korean Patent Application No. 10-2022-0156160, filed on Nov. 21, 2022, in the Korean Intellectual Property Office, the disclosure of which is incorporated herein by reference in its entirety.

TECHNICAL FIELD

The following disclosure relates to a battery module comprising a bent vapor chamber, and more particularly, to a battery module comprising a bent vapor chamber, in which a plurality of battery cells included in the battery module are cooled by the plurality of bent vapor chambers.

BACKGROUND

A battery used in a machine requiring output greater than output required for a conventional electric vehicle may generate a large amount of heat, and thus need to be effectively cooled.

For example, air mobility may require two to three times greater output than the conventional electric vehicle. The air mobility requiring such greater output may generate a large amount of heat from its battery that is used as a power source, and the battery may thus need to be cooled more effectively.

FIG. 1 is a view showing a conventional cooling structure of a battery cell.

As shown in FIG. 1, a conventional cooling structure 2 of a battery cell may cool a battery cell 1000 by bringing a cooling block 2000 into contact with one side of the battery cell 1000.

In the conventional cooling structure 2 of the battery cell, a portion of the battery cell 1000 that is adjacent to the cooling block 2000 may be cooled to have a lower temperature. However, a portion of the battery cell 1000 that is far from the cooling block 2000 may be cooled to a higher temperature due to lower cooling efficiency.

In addition, the battery cell 1000 may have a temperature higher than an allowable temperature because the battery cell 1000 fails to be sufficiently cooled.

Therefore, when the battery cell is cooled using the conventional cooling structure 2 of the battery cell, a temperature deviation of the battery cell for each position may be large or the battery cell may be overheated to thus cause a problem such as lower performance of the battery cell. Therefore, it is necessary to develop a battery module having a cooling structure which may effectively cool the battery cell while minimizing the temperature deviation of the battery cell for each position.

SUMMARY

An embodiment of the present disclosure is directed to providing a battery module including a cooling structure which may effectively cool a battery cell.

Another embodiment of the present disclosure is directed to providing a battery module including a cooling structure which may cool a battery cell while minimizing temperature deviation of the battery cell for each position.

Technical tasks of the present disclosure are not limited to those mentioned above, and other tasks not mentioned here may be obviously understood by those skilled in the art from the following description.

In one general aspect, a battery module comprising a bent vapor chamber includes: a plurality of battery cells; a plurality of vapor chambers each installed between the adjacent battery cells among the plurality of battery cells to absorb heat from the plurality of battery cells; a heat transfer interface material coupled to one side of the plurality of vapor chambers to be in contact with the plurality of vapor chambers, and receiving heat from the vapor chambers; and a cooling channel coupled to one side of the heat transfer interface material to receive heat from heat transfer interface material and transfer heat to the outside, wherein the vapor chamber has a chamber in which a fluid is able to circulate and move, the chamber is filled with a working fluid, and the working fluid is vaporized by receiving heat from the battery cell and liquefied by transferring heat to the heat transfer interface material while circulating in the chamber, the vapor chamber includes an extension part parallel to the plurality of battery cells, and a condensation part which is one end bent in one direction perpendicular to the extension part, and the condensation part is inserted into the heat transfer interface material.

At least a portion of the chamber may be included in the condensation part.

In another general aspect, a battery module comprising a bent vapor chamber includes: a plurality of battery cells; a plurality of vapor chambers each installed between adjacent battery cells among the plurality of battery cells to absorb heat from the plurality of battery cells; a heat transfer interface material coupled to one side of the plurality of vapor chambers to be in contact with the plurality of vapor chambers, and receiving heat from the vapor chambers; and a cooling channel coupled to one side of the heat transfer interface material to receive heat from heat transfer interface material and transfer heat to the outside, wherein the vapor chamber has a chamber in which a fluid is able to circulate and move, the chamber is filled with a working fluid, and the working fluid is vaporized by receiving heat from the battery cell and liquefied by transferring heat to the heat transfer interface material while circulating in the chamber, the vapor chamber includes an extension part parallel to the plurality of battery cells, and a condensation part which is one end bent in a first direction perpendicular to the extension part and a second direction parallel to the first direction and perpendicular to the extension part, and the condensation part is inserted into the heat transfer interface material.

At least a portion of the chamber may be included in the condensation part.

A length of the condensation part may be 50% or more and 100% or less of a thickness of the battery cell.

The vapor chamber may include an arc-shaped connection part connecting the extension part and the condensation part to each other.

The connection part may have a curvature radius of 2 mm or more.

The battery module may further include: a board including a bus bar electrically connecting the plurality of battery cells to each other and a printed wiring circuit board for measuring the voltages and temperatures of the plurality of battery cells, and installed on top of the plurality of battery cells; a front plate coupled to the front of the plurality of battery cells; a rear plate coupled to the rear of the plurality of battery cells; a side plate coupled to the side of the plurality of battery cells; and an upper cover coupled to the top of the plurality of battery cells to cover the board.

The vapor chamber may be made of one or more metals selected from copper, aluminum, steel, and titanium.

The working fluid may be any one or more of mineral oil, a fluorinated fluid, and an ester-based fluid.

A pad having elasticity may be installed between the vapor chamber and the battery cell adjacent to the vapor chamber.

The heat transfer interface material may have a thermal conductivity of 3 W/mk or more.

Details of other embodiments are included in the description and drawings of the present disclosure.

BRIEF DESCRIPTION OF THE DRAWINGS

FIG. 1 is a view showing a conventional cooling structure of a battery cell.

FIG. 2 is an exploded view showing a battery module comprising a bent vapor chamber according to an embodiment of the present disclosure.

FIG. 3 is a view showing a flat vapor chamber inserted into a heat transfer interface material.

FIG. 4 is a view showing the bent vapor chamber in which a condensation part bent in one direction is inserted into the heat transfer interface material.

FIG. 5 is a view showing the bent vapor chamber in which a condensation part bent in both directions is inserted into the heat transfer interface material.

FIG. 6 is a graph showing temperature changes of the battery cell cooled by the flat vapor chamber and the battery cell cooled by the bent vapor chamber over time.

FIG. 7 is a view showing the vapor chamber including an extension part, a connection part, and a condensation part.

FIG. 8 is a graph showing thermal resistance based on a ratio of a length of the condensation part to a thickness of the battery cell.

DETAILED DESCRIPTION OF EMBODIMENTS

Hereinafter, embodiments are described in detail with reference to the accompanying drawings to be easily practiced by those skilled in the art to which the present disclosure pertains. However, the present disclosure may be implemented in various different forms and is not limited to the embodiments described herein. In addition, in the drawings, portions unrelated to the description are omitted to clearly describe the present disclosure, and similar portions are denoted by similar reference numerals throughout the specification.

In addition, throughout the specification, when one part is referred to as being "connected to" another part, one part and another part may be "directly connected to" each other, or may be "electrically connected to" each other with still another part interposed therebetween.

Throughout the specification, when one member is referred to as being positioned "on" another member, one member and another member may be in contact with each other, or a third member may be interposed between one member and another member.

Throughout the specification, including one component is to be understood to imply the inclusion of other components rather than the exclusion of other components, unless explicitly described to the contrary. As used throughout the specification, a term of degree "about", "substantially", or the like is used to indicate the number of a stated meaning or its approximation when its manufacturing or material tolerance inherent therein is given. Such a term is used to prevent unscrupulous infringers from unfairly using the present disclosure in which exact or absolute figures are stated to facilitate the understanding of this application. As used throughout the specification, a term of "step of (doing)" or "step of~" does not indicate a "step for~".

Hereinafter, the embodiments of the present disclosure are described in detail with reference to the accompanying drawings and the description provided below. However, the present disclosure is not limited to the embodiments described herein, and may also be embodied in another form. Same reference numerals denote same components throughout the specification.

Hereinafter, the description describes a battery module comprising a bent vapor chamber according to an embodiment of the present disclosure.

FIG. 2 is an exploded view showing the battery module comprising the bent vapor chamber according to an embodiment of the present disclosure.

Referring to FIG. 2, a battery module 1 comprising a bent vapor chamber may include a battery cell 10, a vapor chamber 20, a pad 30, a heat transfer interface material 40, a cooling channel 50, a board 60, a front plate 70, a rear plate 80, a side plate 90, and an upper cover 100.

First, the battery cell 10 is described.

The plurality of battery cells 10 may be provided, and the battery cell may be a conventional prismatic battery cell or a pouch-type battery cell.

Next, the vapor chamber 20 is described.

As shown in FIG. 2, the vapor chamber 20 may be installed between the adjacent battery cells 10 among the plurality of battery cells 10, and absorb heat occurring from the plurality of battery cells 10.

The vapor chamber 20 may be made of one or more metals selected from copper, aluminum, steel, and titanium.

In addition, the vapor chamber 20 may have a chamber in which a fluid may circulate and move, and a working fluid may be accommodated in the chamber. The working fluid may be vaporized by receiving heat from the battery cell 10, and liquefied by transferring heat to the heat transfer interface material 40 described below while circulating in the chamber.

Here, the working fluid may be any one or more of mineral oil, a fluorinated fluid, and an ester-based fluid, having electrical insulation.

As such, the working fluid filling the vapor chamber 20 may be vaporized and liquefied while circulating in the chamber. Accordingly, heat emitted from the battery cell 10 may be dissipated to the outside through the heat transfer interface material 40 and the cooling channel 50 described below, and the battery cell 10 may be cooled.

Meanwhile, the vapor chamber 20 may be inserted into the heat transfer interface material 40, and transfer heat received from the battery cell 10 to the heat transfer interface material 40 described below.

FIG. 3 is a view showing a flat vapor chamber inserted into a heat transfer interface material.

For example, as shown in FIG. 3, the flat vapor chamber 20 may have one end inserted into the heat transfer interface material 40 to transfer heat received from the battery cell 10 to the heat transfer interface material 40.

However, a contact area between the heat transfer interface material 40 and the vapor chamber 20 may be small in this configuration, and the vapor chamber 20 may thus fail to effectively transfer heat received from the battery cell 10 to the heat transfer interface material 40.

To solve this problem, the vapor chamber 20 may be provided to increase the contact area between the vapor chamber 20 and the heat transfer interface material 40.

FIG. 4 is a view showing the bent vapor chamber in which a condensation part bent in one direction is inserted into the heat transfer interface material; and FIG. 5 is a view showing the bent vapor chamber in which a condensation part bent in both directions is inserted into the heat transfer interface material.

For example, as shown in FIG. 4, the vapor chamber 20 may include an extension part 22 parallel to the plurality of battery cells 10, and a condensation part 26 which is one end bent in one direction perpendicular to the extension part 22. Here, the condensation part 26 may be inserted into the heat transfer interface material 40.

For another example, as shown in FIG. 5, the vapor chamber 20 may include the extension part 22 parallel to the plurality of battery cells 10 and a condensation part 26 which is one end bent in a first direction perpendicular to the extension part 22 and a second direction parallel to the first direction and perpendicular to the extension part 22. Here, the condensation part 26 may be inserted into the heat transfer interface material 40.

Here, at least a portion of the chamber formed in the vapor chamber 20 may be included in the condensation part 26.

When the vapor chamber 20 has a shape shown in FIG. 4 or 5, the contact area between the vapor chamber 20 and the heat transfer interface material 40 may be increased, thus increasing cooling efficiency of the battery cell 10.

FIG. 6 is a graph showing temperature changes of the battery cell cooled by the flat vapor chamber and the battery cell cooled by the bent vapor chamber over time.

In detail, as shown in FIG. 6, the battery cell 10 cooled by the bent vapor chamber 20 may have a smaller temperature change over time than the battery cell 10 cooled by the flat vapor chamber 20.

As such, the bent vapor chamber 20 may have a corner bent at a right angle or a corner bent in an arc shape, based on its manufacturing method.

FIG. 7 is a view showing the vapor chamber including the extension part, a connection part, and the condensation part.

In detail, referring to FIG. 7, the vapor chamber 20 having the corner bent in the arc shape may include the arc-shaped connection part 24 connecting the extension part 22 and the condensation part 26 to each other.

Here, the connection part 24 may have a curvature radius R of 2 mm or more to prevent a volume reduction of the chamber formed when the vapor chamber 20 is bent.

Meanwhile, in the condensation part 26 of the vapor chamber 20, a length "d" of the condensation part 26 may be 50% or more and 100% or less of a thickness "a" of the battery cell 10.

The reason is that a contact area between the condensation part 26 and the heat transfer interface material 40 may be increased, and the battery cell 10 may thus be cooled more effectively when the length "d" of the condensation part 26 is 50% or more of the thickness "a" of the battery cell 10 in the condensation part 26 of the vapor chamber 20.

In addition, it is possible to prevent interference occurring between the condensation part 26 and the vapor chamber 20 adjacent thereto when the length "d" of the condensation part 26 is 100% or less of the thickness "a" of the battery cell 10 in the condensation part 26 of the vapor chamber 20.

FIG. 8 is a graph showing thermal resistance based on a ratio of the length of the condensation part to the thickness of the battery cell.

As shown in FIG. 8, a thermal resistance value may be a reference value or less, and the battery cell 10 may thus be cooled more effectively when the length "d" of the condensation part 26 is 50% or more of the thickness "a" of the battery cell 10 in the condensation part 26 of the vapor chamber 20.

Next, the pad 30 is described.

Referring to FIG. 2, the pad 30 may be installed between the vapor chamber 20 and the battery cell 10 adjacent to the vapor chamber 20, and have elasticity to suppress swelling of the battery cell 10 and swelling of the vapor chamber 20.

Next, the heat transfer interface material 40 is described.

Referring to FIG. 2, the heat transfer interface material (TIM) 40 may be coupled to one side of the plurality of battery cells 10 to be in contact with the plurality of vapor chambers 20, and receive heat from the plurality of vapor chambers 20 and transfer heat to the cooling channel 50 described below.

In addition, the heat transfer interface material 40 may have a thermal conductivity of 3 W/mk or more.

Next, the cooling plate 50 is described.

Referring to FIG. 2, the cooling channel 50 may be coupled to one side of the heat transfer interface material 40 to receive heat from the heat transfer interface material 40 and transfer heat to the outside.

This cooling channel 50 may be configured in the same way as the cooling block included in a conventional battery module.

Next, the board 60 is described.

Referring to FIG. 2, the board 60 may include a bus bar electrically connecting the plurality of battery cells 10 to each other and a printed wiring circuit board (PCB) for measuring the voltages and temperatures of the plurality of battery cells 10, and may be installed on top of the plurality of battery cells 10.

Next, the front plate 70, the rear plate 80, and the side plate 90 are described.

Referring to FIG. 2, the front plate 70 may be coupled to the front of the plurality of battery cells 10, the rear plate 80 may be coupled to the rear of the plurality of battery cells 10, and the side plate 90 may be coupled to the side of the plurality of battery cells 10.

The front plate 70, the rear plate 80, and the side plate 90 may each have a plate shape.

Next, the upper cover 100 is described.

Referring to FIG. 2, the upper cover 100 may be coupled to the top of the plurality of battery cells 10 to cover the board 60, and may have a plate shape.

As such, in the battery module comprising the bent vapor chamber according to the present disclosure, the bent condensation part of the vapor chamber may be inserted into the heat transfer interface material to effectively transfer heat received from the battery cell to the heat transfer interface material, thus effectively cooling the battery cell.

In addition, the bent condensation part of the vapor chamber may be inserted into the heat transfer interface material to effectively transfer heat received from the battery cell to the heat transfer interface material to thus effectively diffuse heat emitted from the battery cell and minimize a temperature deviation of the battery cell for each position, thereby preventing lower performance of the battery cell.

As set forth above, according to one general aspect of the present disclosure described above, in the battery module comprising the bent vapor chamber according to the present disclosure, the bent condensation part of the vapor chamber may be inserted into the heat transfer interface material to effectively transfer heat received from the battery cell to the heat transfer interface material, thus effectively cooling the battery cell.

In addition, the bent condensation part of the vapor chamber may be inserted into the heat transfer interface material to effectively transfer heat received from the battery cell to the heat transfer interface material to thus effectively diffuse heat emitted from the battery cell and minimize the temperature deviation of the battery cell for each position, thereby preventing the lower performance of the battery cell.

The above-described embodiments are illustratively provided, and it is apparent to those skilled in the art to which the present disclosure pertains that the present disclosure may be embodied in another specific form without any change in its technical idea or essential characteristics. Therefore, it is to be understood that the embodiments described hereinabove are illustrative rather than restrictive in all respects. For example, the components each described as a single type may also be implemented in a distributed manner, and similarly, the components described as being distributed from each other may also be implemented in a combined manner.

It is to be understood that the scope of the present disclosure is defined by the claims disclosed below rather than the detailed description provided above, and includes all alternations and modifications derived from the claims and their equivalents.

What is claimed is:

1. A battery module comprising:
a plurality of battery cells;
a plurality of vapor chambers each installed between adjacent battery cells among the plurality of battery cells to absorb heat from the plurality of battery cells;
a heat transfer interface material coupled to one side of the plurality of vapor chambers to be in contact with the plurality of vapor chambers, and receiving heat from the plurality of vapor chambers; and
a cooling channel coupled to one side of the heat transfer interface material to receive heat from the heat transfer interface material and transfer heat to outside,
wherein each of the plurality of vapor chambers has a chamber in which a fluid is able to circulate and move therein, the chamber is filled with a working fluid, and the working fluid is vaporized by receiving heat from the battery cell and liquefied by transferring heat to the heat transfer interface material while circulating in the chamber,
each of the plurality of vapor chambers includes an extension part parallel to the plurality of battery cells, and a condensation part which is one end bent in one direction perpendicular to the extension part, and the condensation part is inserted into the heat transfer interface material.

2. The battery module of claim 1, wherein at least a portion of the chamber is included in the condensation part.

3. The battery module of claim 2, wherein a length of the condensation part is 50% or more and 100% or less of a thickness of the battery cell.

4. The battery module of claim 3, wherein each of the plurality of vapor chambers includes an arc-shaped connection part connecting the extension part and the condensation part to each other.

5. The battery module of claim 4, wherein the connection part has a curvature radius of 2 mm or more.

6. The battery module of claim 5, further comprising:
a board including a bus bar electrically connecting the plurality of battery cells to each other and a printed wiring circuit board for measuring voltages and temperatures of the plurality of battery cells, and installed on top of the plurality of battery cells;
a front plate coupled to a front of the plurality of battery cells;
a rear plate coupled to a rear of the plurality of battery cells;
at least two side plates coupled to two sides of the plurality of battery cells; and
an upper cover coupled to a top of the plurality of battery cells to cover the board.

7. The battery module of claim 6, wherein each of the plurality of vapor chambers is made of one or more metals selected from copper, aluminum, steel, and titanium.

8. The battery module of claim 7, wherein the working fluid is any one or more of mineral oil, a fluorinated fluid, and an ester-based fluid.

9. The battery module of claim 8, wherein a pad having elasticity is installed between each of the plurality of vapor chambers and the adjacent battery cell among the plurality of battery cells.

10. The battery module of claim 9, wherein the heat transfer interface material has a thermal conductivity of 3 W/mk or more.

11. A battery module comprising:
a plurality of battery cells;
a plurality of vapor chambers each installed between adjacent battery cells among the plurality of battery cells to absorb heat from the plurality of battery cells;
a heat transfer interface material coupled to one side of the plurality of vapor chambers to be in contact with the plurality of vapor chambers, and receiving heat from the plurality of vapor chambers; and
a cooling channel coupled to one side of the heat transfer interface material to receive heat from the heat transfer interface material and transfer heat to outside,
wherein each of the plurality of vapor chambers has a chamber in which a fluid is able to circulate and move, the chamber is filled with a working fluid, and the working fluid is vaporized by receiving heat from the battery cell and liquefied by transferring heat to the heat transfer interface material while circulating in the chamber,
each of the plurality of vapor chambers includes an extension part parallel to the plurality of battery cells, and a condensation part which is one end bent in a first direction perpendicular to the extension part and a second direction parallel to the first direction and perpendicular to the extension part, and
the condensation part is inserted into the heat transfer interface material.

12. The battery module of claim 11, wherein at least a portion of the chamber is included in the condensation part.

13. The battery module of claim 12, wherein a length of the condensation part is 50% or more and 100% or less of a thickness of the battery cell.

14. The battery module of claim 13, wherein each of the plurality of vapor chambers includes an arc-shaped connection part connecting the extension part and the condensation part to each other.

15. The battery module of claim 14, wherein the connection part has a curvature radius of 2 mm or more.

16. The battery module of claim 15, further comprising:
a board including a bus bar electrically connecting the plurality of battery cells to each other and a printed wiring circuit board for measuring voltages and temperatures of the plurality of battery cells, and installed on top of the plurality of battery cells;

a front plate coupled to a front of the plurality of battery cells;

a rear plate coupled to a rear of the plurality of battery cells;

at least two side plates coupled to two sides of the plurality of battery cells; and an upper cover coupled to a top of the plurality of battery cells to cover the board.

17. The battery module of claim 16, wherein each of the plurality of vapor chambers is made of one or more metals selected from copper, aluminum, steel, and titanium.

18. The battery module of claim 17, wherein the working fluid is any one or more of mineral oil, a fluorinated fluid, and an ester-based fluid.

19. The battery module of claim 18, wherein a pad having elasticity is installed between each of the plurality of vapor chambers and the adjacent battery cell among the plurality of battery cells.

20. The battery module of claim 19, wherein the heat transfer interface material has a thermal conductivity of 3 W/mk or more.

* * * * *